Figure 2:
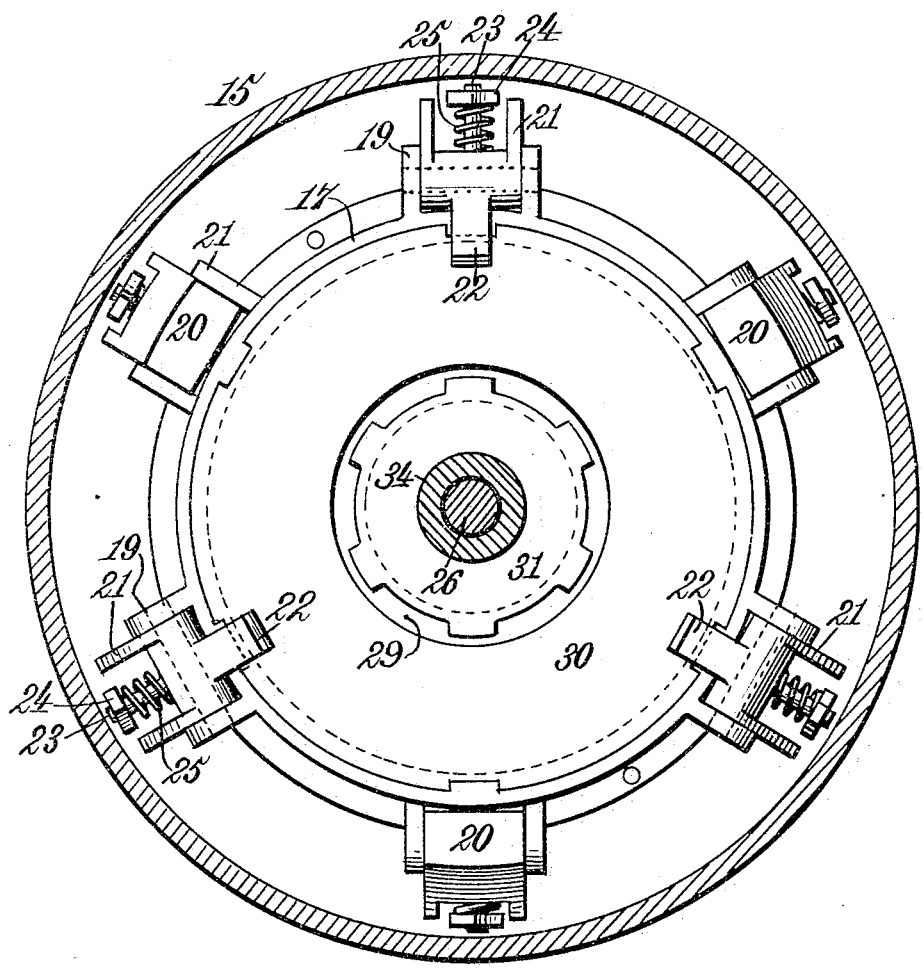

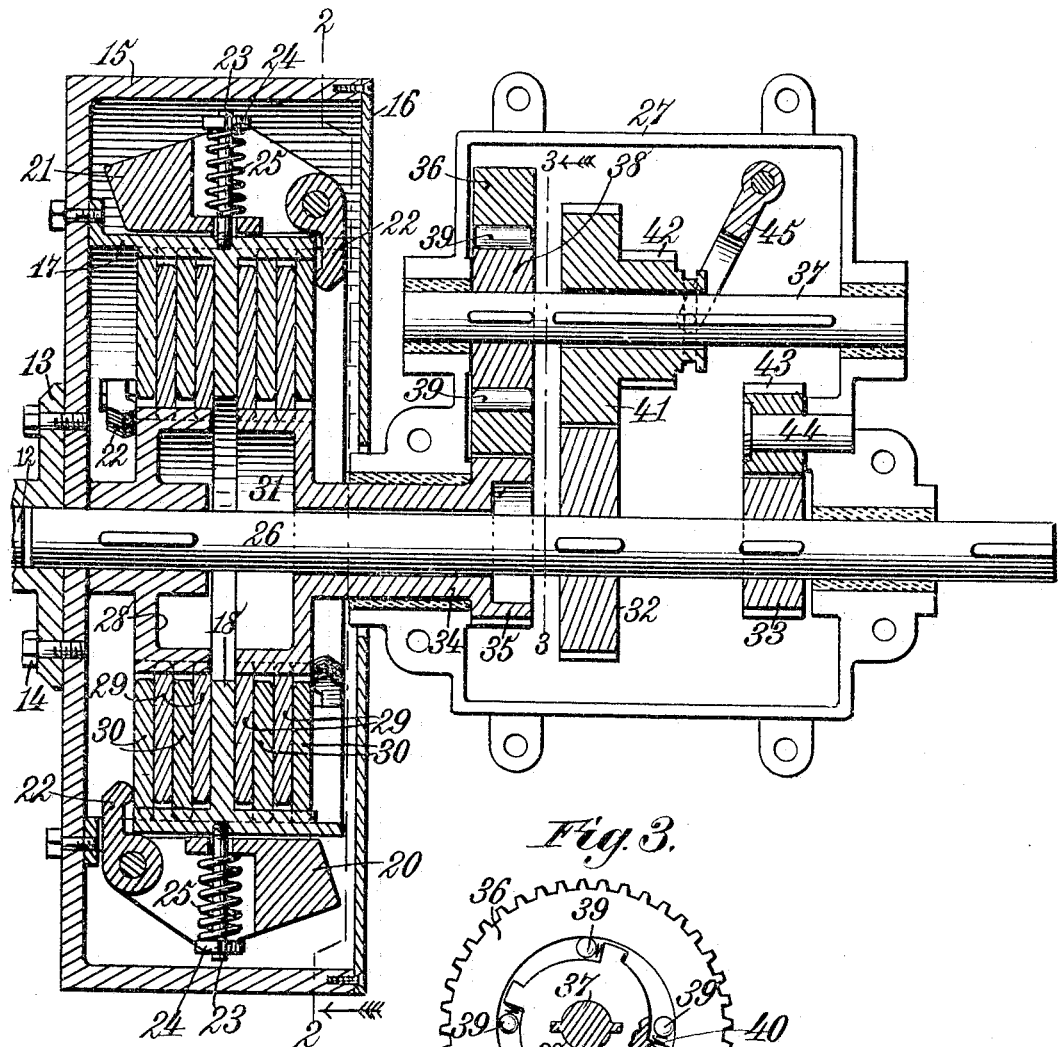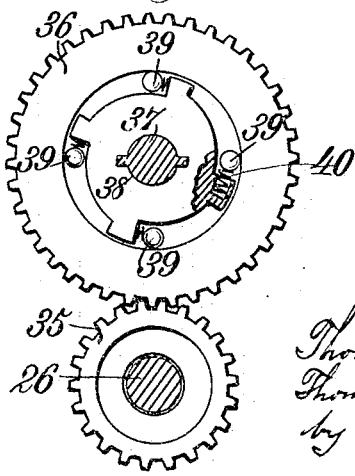

No. 766,551. PATENTED AUG. 2, 1904.
T. L. & T. J. STURTEVANT.
CLUTCH DEVICE POWER TRANSMITTING MECHANISM.
APPLICATION FILED JAN. 5, 1904.
NO MODEL. 2 SHEETS—SHEET 2.

Witnesses.
Robert Everett.
C. M. Sweeney.

Inventors:
Thomas L. Sturtevant,
Thomas J. Sturtevant,
by Henry Calvert,
Atty.

No. 766,551. Patented August 2, 1904.

UNITED STATES PATENT OFFICE.

THOMAS L. STURTEVANT, OF QUINCY, AND THOMAS J. STURTEVANT, OF WELLESLEY, MASSACHUSETTS.

CLUTCH-DEVICE POWER-TRANSMITTING MECHANISM.

SPECIFICATION forming part of Letters Patent No. 766,551, dated August 2, 1904.

Application filed January 5, 1904. Serial No. 187,822. (No model.)

*To all whom it may concern:*

Be it known that we, THOMAS L. STURTEVANT, residing at Quincy, and THOMAS J. STURTEVANT, residing at Wellesley, in the county of Norfolk and State of Massachusetts, citizens of the United States, have invented certain new and useful Improvements in Clutch-Device Power-Transmitting Mechanisms, of which the following is a specification, reference being had therein to the accompanying drawings.

This invention relates to a clutch-and-gearing mechanism by which power may be transmitted from a motor or power-shaft to any suitable device or mechanism to be driven and in such a manner that when the load or duty becomes too heavy or great for a certain speed the clutch-and-gearing mechanism will be automatically shifted or changed from a higher to a lower speed with greater torque or purchase, so that if the power received from the motor or power-shaft be insufficient for the higher speed it will be rendered effective and sufficient for the lower speed.

The invention is therefore particularly adapted for use in automobiles in transmitting power from a motor to the driving-wheels, but is also suitable for other uses.

The invention in its preferred form comprises a plurality of two or more independently-acting and centrifugally-controlled and varying-speed clutch devices which may be adjusted so as to automatically effect the engagement of the clutching parts at any desired predetermined speed and which are so constructed and arranged that when the power received from the engine or power-shaft diminishes or the load or duty increases, or vice versa, the higher-speed clutch device will be automatically thrown out of action and the lower-speed clutch device rendered effective, or vice versa, so that the changes from one driving speed to another will be effected without requiring any care or attention on the part of the attendant.

In the accompanying drawings, Figure 1 is a longitudinal sectional view of a mechanism embodying the present invention. Fig. 2 is an elevation, partly in cross-section on line 2 2, Fig. 1, looking in the direction of the arrow adjacent said line; and Fig. 3 is an elevation, partly in cross-section on line 3 3, Fig. 1, looking in the direction of the arrow adjacent said line.

Referring to the drawings, 12 denotes a portion of an engine or power-shaft having an end flange 13, to which is rigidly attached, as by screws or bolts 14, a casing 15, adapted to serve as a fly-wheel and also, in connection with a side plate 16 attached thereto, as a housing for the clutching mechanism. Rigidly attached to the casing 15 is a ring 17, provided with a central inwardly-extending web or flange 18. The ring 17 is provided at its periphery with a series of lugs 19, in which are pivotally mounted the centrifugal clutch-controlling devices 20 and 21 and consisting of weights having angular arms or projections 22. Interposed between nuts 24 on studs 23, attached to the ring 17, and portions of said weights are springs 25, which serve to hold the said weights 20 and 21 against the periphery of the ring 17 until a certain speed of rotation is reached, when the stress of said springs will be overcome and the said weights will be forced outward by centrifugal action to effect an engagement of the frictional clutch members, as will be presently described.

The clutch-casing or fly-wheel 15 is adapted to rotate independently of the power-transmitting or driving shaft 26, which has bearings in a gear-case 27. Keyed or otherwise suitably secured to the shaft 26 is a high-speed hub or clutch-drum 28, engaged with which to rotate therewith by means of interlocking notches and projections are clutch rings or disks 29, and engaged with the ring 17 to rotate therewith, also by interlocking notches or projections, are clutch rings or disks 30, alternating with the clutch rings or disks 29. Mounted to rotate loosely on the shaft 26 is a low-speed hub or clutch-drum 31, with which are also engaged to rotate therewith a series of clutch rings or disks 29, alternating with clutch rings or disks 30, rotating with the ring 17. The clutch rings or disks 29 and 30 are free to move longitudinally of the shaft 26 for clutching and unclutching operation. The several clutch rings or disks will be forced into frictional clutching engagement with each other and the web or flange 18 of the ring 17 by the arms 22 of the weights 20 and 21 when the speed of rotation of the clutch-casing or fly-wheel 15 is sufficient to overcome by centrifugal action the stress of the springs 25. The high-speed centrifugal weights 20 will be controlled by springs 25 of greater power or stress or placed under greater tension than the springs controlling the low-speed centrifugal weights 21, and these springs may be adjusted by means of the nuts 24 to any desired degree of tension or stress to be overcome by any desired predetermined speed of rotation of the fly-wheel or casing 15, connected with the motor or power-shaft 12.

Keyed or otherwise secured to the shaft 26 to rotate therewith are gear-wheels 32 and 33. Connected with the clutch drum or hub 31 by a sleeve 34 is a gear-wheel 35, meshing with a larger gear-wheel or gear-ring 36, connected with a shaft 37, mounted in suitable bearings in the gear-case 27 by a silent ratchet or grip device comprising a wheel 38, keyed to the said shaft and provided at its periphery with tapering recesses for the reception of clutch or grip rollers 39, with which coöperate coil-springs 40 to assist in the initial grip operation, but which springs will yield when the shaft 37 overruns in speed the gear-wheel 36, and thereby disengages the said gear-wheel from its grip or silent-ratchet connection with said shaft. Splined to the shaft 37 to rotate therewith is a gear-wheel 41, meshing with the gear-wheel 32 on the shaft 27, the hub of the said gear-wheel 41 being provided with a smaller gear-wheel 42, adapted to be shifted into engagement with an idler-gear 43, rotating on a stud 44 and meshing with the gear 33, keyed to the power-transmitting shaft 26. The annularly-grooved hub of the gear 42 is engaged by a pin or pins on a shifting arm or lever 45 and by which the gears 41 and 42 may be shifted lengthwise of the shaft 37 to disengage the gear 41 from the gear 32 and to engage the gear 42 with the gear 43 when the direction of rotation of the power-transmitting shaft 26 is to be reversed.

The operation of the above-described mechanism is as follows: When the fly-wheel or clutch-casing 15 attains a speed of rotation sufficient to overcome the stress of the springs holding the low-speed centrifugal weights inward, the said weights will be forced outward and the arms 22 connected therewith will force the low-speed clutching-disks into frictional engagement with each other, and thus, through the clutch drum or hub 31, sleeve 34, gears 35 36, and the silent-ratchet or grip device, will set the shaft 37 into rotation, and the latter, through the gears 41 and 32, will transmit movement to the drive or power-transmitting shaft 26. If the speed of rotation of the fly-wheel or clutch-casing 15 be increased to a point sufficient to overcome the stress of the springs 25, controlling the high-speed centrifugal weights 20, said last-named weights will be forced outward and their arms 22 will force the high-speed clutch-disks into frictional engagement with each other, and thus impart movement to the power-transmitting shaft 26 direct through the clutch-drum 28, keyed to said shaft. The gears 35 and 36 are so proportioned relative to each other as to impart a lower speed of rotation to the shaft 37, and consequently to the shaft 26, through the gears 41 and 32, than will be imparted to the said shaft 26 when the high-speed clutch device is in operation, and consequently when the shaft 26 is running at the higher speed its gearing connection with the shaft 37 will cause the said shaft 37 to overrun the speed of rotation of the gear-wheel 36, so that the said gear-wheel 36 will have a relative backward movement which will disengage the clutching-rollers 39 from said gear-wheel and allow the silent-ratchet or grip device connecting said gear-wheel with said shaft 37 to run free, and consequently the gearing connections with the low-speed clutch-disks will run idly when the high-speed clutch-disks are engaged. If, however, the duty or load on the power-transmitting shaft 26 becomes too great for the power received from the motor or driving-shaft for the high speed at which the mechanism may be running, or if the power received from the motor or power-shaft be lessened so as to reduce such high speed below the point at which the high-speed centrifugal clutch-weights are set to operate, the high-speed clutches will cease to act and the low-speed clutches will immediately come into operation and continue the rotation of the power-transmitting shaft, but at a reduced rate of speed, through the lower gearing connecting the low-speed clutch-disks with the said power-transmitting shaft 26. If at any time the load or duty on the power-transmitting shaft becomes sufficiently heavy or great to throw the low-speed clutches out of action, by reducing the speed of rotation of the fly-wheel and clutch-gear casing 15 below the predetermined speed-point for which the low-speed centrifugal clutch-weights may be adjusted the motor or power-shaft will become entirely disengaged from the power-transmitting shaft 26 and the engine or motor will then run free until it attains a speed sufficient to again engage the low-speed clutch device.

In view of the fact that the mutiple-disk clutch devices are inclosed or housed in the fly-wheel or casing 15, with its side plate 16, dirt or dust will be effectively excluded from the said clutch devices, and, moreover, the inclosing casing is adapted to contain a lubricant, so that the clutch devices may run in oil, which will prevent undue wear and friction when the clutch parts or disks are being engaged or disengaged or at other times and when there will be more or less slip or relative movement between the several parts. These centrifugally-controlled multiple-disk clutch devices providing, as they do, a plurality of clutching parts, which may be increased at will, according to the requirements of any particular mechanism to be driven, afford very strong and powerful friction-clutches, notwithstanding the fact that they may be kept lubricated for the purpose just above indicated.

The present invention is not to be understood as being limited to the details of construction herewith shown and described or to only two sets of centrifugally-controlled multiple-disk clutch devices for rotating a power-transmitting shaft at two speeds only, as additional clutch devices and gearing connections may be employed for automatically rotating a power-transmitting shaft at three or more predetermined speeds of rotation, or a single centrifugally-controlled multiple-disk clutch device might be employed for imparting a single predetermined speed to a power-transmitting shaft, and other variations may be made from the principles of the present invention without departing from the spirit or the essential features thereof and relating to the automatic change-gear connections with a part or shaft to be driven and controlled by the load or road resistance relative to the power being applied to the power-driven part or shaft.

We do not claim the clutch-device feature of our invention broadly or independently of the gearing mechanism in this application, as the same is embraced by our application, Serial No. 193,818, filed February 16, 1904, as a division of this application.

Having thus described our invention, we claim and desire to secure by Letters Patent—

1. In a power-transmitting device, the combination with a rotating power-driven part, and a shaft to be driven therefrom, of high-speed and low-speed clutch devices adapted to be connected with said shaft, and separately centrifugally controlled, so as to be set in clutching operation at different speeds of rotation of the driving part, and means whereby the said high-speed and low-speed clutch devices may, respectively, be rendered effective for transmitting power to the shaft to be driven at different predetermined speeds of rotation of the rotary driving part, so that when the high-speed clutch device is transmitting power the low-speed clutch device will be automatically rendered ineffective as a power-transmitting device, and vice versa.

2. In a power-transmitting device, the combination with a rotating power-driven part, and a shaft to be driven therefrom, of high-speed and low-speed multiple-disk clutch devices adapted to be connected with said shaft, and separately centrifugally controlled, so as to be set in clutching operation at different speeds of rotation of the driving part, and means whereby the said high-speed and low-speed clutch devices may, respectively, be rendered effective for transmitting power to the shaft to be driven at different predetermined speeds of rotation of the rotary driving part, so that when the high-speed clutch is transmitting power the low-speed clutch device will be automatically rendered ineffective as a power-transmitting device, and vice versa.

3. In a power-transmitting device, the combination with a rotating power-driven part, and a shaft to be driven therefrom, of centrifugally-controlled high-speed and low-speed clutch devices adapted to be connected with said shaft, means whereby the said high-speed and low-speed clutch devices may, respectively, be rendered effective for transmitting power to the shaft to be driven at different predetermined speeds of rotation of the rotary driving part, so that when the high-speed clutch device is transmitting power the low-speed clutch device will be automatically rendered ineffective as a power-transmitting device, and vice versa, and a fly-wheel inclosing said clutch devices.

4. In a power-transmitting device, the combination with a rotating power-driven part, and a shaft to be driven therefrom, of centrifugally-controlled high-speed and low-speed multiple-disk clutch devices adapted to be connected with said shaft, means whereby the said high-speed and low-speed clutch devices may, respectively, be rendered effective for transmitting power to the shaft to be driven, at different predetermined speeds of rotation of the rotary driving part, so that when the high-speed clutch device is transmitting power the low-speed clutch device will be automatically rendered ineffective as a power-transmitting device, and vice versa, and a fly-wheel inclosing said clutch devices.

5. In a power-transmitting device, the combination with a rotating power-driven part, and a shaft to be driven therefrom, of separately centrifugally controlled high-speed and low-speed clutch devices adapted to be connected with said shaft, means whereby the said high-speed and low-speed clutch devices may, respectively, be rendered effective for transmitting power to the shaft to be driven, at different predetermined speeds of rotation of the rotary driving part, so that when the high-speed clutch device is transmitting power the low-speed clutch device will be automatically rendered ineffective as a power-transmitting device, and vice versa, and reducing-gearing through which the low-speed clutch device may transmit power to the shaft to be driven with greater torque or purchase than does the high-speed clutch device.

6. In a power-transmitting device, the combination with a rotating power-driven part, and a shaft to be driven therefrom, of separately centrifugally controlled high-speed and low-speed, multiple-disk clutch devices adapted to be connected with said shaft, means whereby the said high-speed and low-speed clutch devices may, respectively, be rendered effective for transmitting power to the shaft to be driven, at different predetermined speeds of rotation of the rotary driving part, so that when the high-speed clutch device is transmitting power the low-speed clutch device will be automatically rendered ineffective as a power-transmitting device, and vice versa, and reducing-gearing through which the low-speed clutch device may transmit power to the shaft to be driven with greater torque or purchase than the high-speed clutch device.

7. In a power-transmitting device, the combination with a rotating power-driven part, and a shaft to be driven therefrom, of centrifugally-controlled high-speed and low-speed clutch devices adapted to be connected with said shaft, means whereby the said high-speed and low-speed clutch devices may, respectively, be rendered effective for transmitting power to the shaft to be driven, at different predetermined speeds of rotation of the rotary driving part, so that when the high-speed clutch device is transmitting power the low-speed clutch device will be automatically rendered ineffective as a power-transmitting device, and vice versa, reducing-gearing through which the low-speed clutch device may transmit power to the shaft to be driven with greater torque or purchase than the high-speed clutch device, and a fly-wheel inclosing said clutch devices.

8. In a power-transmitting device, the combination with a rotating power-driven part, and a shaft to be driven therefrom, of centrifugally-controlled high-speed and low-speed, multiple-disk clutch devices adapted to be connected with said shaft, means whereby the said high-speed and low-speed clutch devices may, respectively, be rendered effective for transmitting power to the shaft to be driven, at different predetermined speeds of rotation of the rotary driving part, so that when the high-speed clutch device is transmitting power the low-speed clutch device will be automatically rendered ineffective as a power-transmitting device, and vice versa, reducing-gearing through which the low-speed clutch device may transmit power to the shaft to be driven with greater torque or purchase than the high-speed clutch device, and a fly-wheel inclosing said clutch devices.

9. In a power-transmitting device, the combination with a rotating power-driven part, and a shaft to be driven therefrom, of centrifugally-controlled high-speed and low-speed clutch devices connected with said shaft, reducing-gearing through which the low-speed clutch devices may transmit power to the shaft to be driven with greater torque or purchase than the high-speed clutch devices, and a silent ratchet or grip device in the train of said reducing-gearing, and which is rendered inoperative when power is being transmitted to the shaft to be driven through the high-speed clutch devices.

10. In a power-transmitting device, the combination with a rotating power-driven part, and a shaft to be driven therefrom, of centrifugally-controlled high-speed and low-speed, multiple-disk clutch devices connected with said shaft, reducing-gearing through which the low-speed clutch devices may transmit power to the shaft to be driven with greater torque or purchase than the high-speed clutch devices, and a silent ratchet or grip device in the train of said reducing-gearing, and which is rendered inoperative when power is being transmitted to the shaft to be driven through the high-speed clutch devices.

11. In a power-transmitting device, the combination with a rotating power-driven part, and a shaft to be driven therefrom, of centrifugally-controlled high-speed and low-speed multiple-disk clutch devices connected with said shaft, reducing-gearing through which the low-speed clutch devices may transmit power to the shaft to be driven with greater torque or purchase than the high-speed clutch devices, a silent ratchet or grip device in the train of said reducing-gearing, and which is rendered inoperative when power is being transmitted to the shaft to be driven through the high-speed clutch device, and a fly-wheel inclosing said multiple-disk clutch devices.

12. In a power-transmitting device, the combination with a rotating power-driven part and a shaft to be driven therefrom, of two-speed multiple-disk clutch devices and gearing, whereby either high-speed or low-speed motion will be imparted to the shaft to be driven when the driving part reaches certain predetermined speeds of rotation, centrifugally-controlled means whereby the acting faces of one of said clutch devices are forced into frictional gripping contact at a speed of rotation different from the other, and a casing inclosing said clutch devices and adapted to contain lubricating-oil therefor.

13. In a power-transmitting device, the combination with a rotating power-driven part, and a shaft to be driven therefrom, of centrifugally-controlled high-speed and low-speed clutch devices adapted to be connected with said shaft, means whereby the said high-speed and low-speed clutch devices may, respectively, be rendered effective for transmitting power to the shaft to be driven at different predetermined speeds of rotation of the rotary driving parts, so that when the high-speed clutch device is transmitting power the low-speed clutch device will be automatically thrown out of action, and vice versa, and a reversing mechanism for said driven shaft.

14. In a power-transmitting device, the combination with a rotating power-driven part, and a shaft to be driven therefrom, of centrifugally-controlled high-speed and low-speed multiple-disk clutch devices adapted to be connected with said shaft, means whereby the said high-speed and low-speed clutch devices may, respectively, be rendered effective for transmitting power to the shaft to be driven at different predetermined speeds of rotation of the rotary driving part, so that when the high-speed clutch is transmitting power the low-speed clutch device will be automatically rendered ineffective as a power-transmitting device, and vice versa, and a reversing mechanism for said shaft to be driven.

15. In a power-transmitting device, the combination with a rotating power-driven part, and a shaft to be driven therefrom, of centrifugally-controlled high-speed and low-speed clutch devices adapted to be connected with said shaft, means whereby the said high-speed and low-speed clutch devices may, respectively, be rendered effective for transmitting power to the shaft to be driven, at different predetermined speeds of rotation of the rotary driving part, so that when the high-speed clutch device is transmitting power the low-speed clutch device will be automatically rendered ineffective as a power-transmitting device, and vice versa, a train of reducing-gears through which the low-speed clutch device may transmit power to the shaft to be driven with greater torque or purchase than the high-speed clutch device, said train including a sliding reversing-gear.

16. In a power-transmitting device, the combination with a rotating power-driven part, and a shaft to be driven therefrom, of centrifugally-controlled high-speed and low-speed, multiple-disk clutch devices adapted to be connected with said shaft, means whereby the said high-speed and low-speed clutch devices may, respectively, be rendered effective for transmitting power to the shaft to be driven, at different predetermined speeds of rotation of the rotary driving part, so that when the high-speed clutch device is transmitting power the low-speed clutch device will be automatically rendered ineffective to transmit power to the shaft to be driven, and vice versa, reducing-gearing through which the low-speed clutch device may transmit power to the shaft to be driven with greater torque or purchase than the high-speed clutch device, and a shiftable gear for reversing the direction of rotation of the said shaft to be driven.

17. In a power-transmitting device, the combination with a rotating power-driven part, and a shaft to be driven therefrom, of centrifugally-controlled high-speed and low-speed clutch devices connected with said shaft, reducing-gearing through which the low-speed clutch devices may transmit power to the shaft to be driven with greater torque or purchase than the high-speed clutch devices, a silent ratchet or grip device in the train of said reducing-gearing, and which is rendered inoperative when power is being transmitted to the shaft to be driven through the high-speed clutch device, and reversing-gears for the said shaft to be driven.

18. In a power-transmitting device, the combination with a rotating power-actuated driving part and a shaft to be driven therefrom, of a plurality of centrifugally-controlled clutch devices separately adjusted for frictional clutching operation at different predetermined speeds, means whereby each of said centrifugally-controlled clutch devices may transmit motion to said shaft when the rotating power-driven part runs at the speed predetermined for setting each particular clutch into action, and automatic means for shifting the connections of said clutch devices with said shaft into action from a lower to a higher speed, and vice versa.

19. In a power-transmitting device, the combination with a rotating power-actuated driving part and a shaft to be driven therefrom, of a plurality of centrifugally-controlled multiple-disk clutch devices separately adjusted for frictional clutching operation at different predetermined speeds, means whereby each of said centrifugally-controlled clutch devices may transmit motion to said shaft when the rotating power-driven part runs at the speed predetermined for setting each particular clutch into action, and automatic means for shifting the connections of said clutch devices with said shaft into action from a lower to a higher speed, and vice versa.

20. In a power-transmitting device, the combination with a rotating power-actuated driving part, and a part to be driven therefrom, of a centrifugally-controlled multiple-disk clutch device, a change-gear train through which said clutch device is connected with the part to be driven, and a disconnectible silent ratchet or grip device in said change-gear train, so that the driven part may overrun, and thus render idle the change-gear train.

21. In a power-transmitting device, the combination with a ring and means for rotating the same, of a two-speed multiple-disk clutch device within said ring, two sets of pivoted centrifugal weights located at the periphery of said ring, and adjusted for different speeds, said weights having angular arms to force said disks into clutching contact when said weights are swung outward, springs for forcing said weights inward toward said ring, a part to be driven by said clutch device, means for rendering ineffective the low-speed part of said clutch device for transmitting power when the high-speed part of said clutch device is in operation, and gearing between the said part to be driven and the said low-speed part of the said clutch device.

22. In a power-transmitting device, the combination with a ring provided with a central internal web or flange, of means for rotating said ring, two sets of friction clutch-disks within said ring, on opposite sides of said web, or flange, one set of clutch-disks engaging said ring, to rotate therewith, clutch hubs or drums with which the other set of said clutch-disks are engaged, to rotate therewith, two sets of pivoted centrifugal weights adjusted for different speeds and having arms to force said disks into clutching contact when said weights are swung outward, a shaft on which said clutch hubs or drums are mounted and with which they are operatively connected, means for rendering ineffective the low-speed part of the clutch device for transmitting power when the high-speed part of said clutch device is in operation, and gearing between said shaft to be driven and the said low-speed part of said clutch device.

23. In a power-transmitting device, the combination with a ring provided with a central web or flange, of two sets of friction clutch-disks within said ring on opposite sides of said web or flange, one set of clutch-disks engaging said ring, to rotate therewith, clutch hubs or drums with which the other set of said clutch-disks are engaged to rotate therewith, pivoted centrifugal weights having arms to force said disks into clutching contact when said weights are swung outward, a shaft on which said clutch hubs or drums are mounted and with which they are operatively connected, a rotating fly-wheel or casing inclosing said ring, weights, disks and hubs or drums, a shaft to be driven, means for rendering ineffective the low-speed clutch device for transmitting power when the high-speed clutch device is in operation, and gearing interposed between said shaft to be driven and the clutch device.

24. In a power-transmitting device, the combination with a rotating power-actuated driving part, and a part to be driven therefrom, of a plurality of clutch devices which are separately centrifugally controlled and which are independently adjusted for operation at different predetermined speeds, means whereby each of said clutch devices may transmit motion to said part to be driven, and means whereby, when the load or resistance of the part to be driven increases to a certain point, or the power received from the power-actuated driving part decreases to a certain point, so as to reduce the speed of rotation of the centrifugally-controlled devices below the point at which they are set for the high-speed clutch device to operate, said high-speed clutch device will be automatically disconnected from the part to be driven and the low-speed clutch device automatically connected therewith; and whereby, also, when the load or resistance on the part to be driven increases, or the power received from the rotating power-actuating driven part decreases, so as to reduce the speed of the centrifugally-controlled clutch devices below the point at which the low-speed clutch device is set to operate, the said low-speed clutch device will also be automatically disconnected from the part to be driven and the power-actuated driving part thus be entirely disconnected from said part to be driven.

25. In a power-transmitting device, the combination with a rotating power-actuated driving part, and a part to be driven therefrom, of a plurality of multiple-disk clutch devices which are separately centrifugally controlled and which are independently adjusted for operation at different predetermined speeds, means whereby each of said clutch devices may transmit motion to said part to be driven, and means whereby, when the load or resistance of the part to be driven increases to a certain point, or the power received from the power-actuated driving part decreases to a certain point, so as to reduce the speed of rotation of the centrifugally-controlled devices below the point at which they are set for the high-speed clutch device to operate, said high-speed clutch device will be automatically disconnected from the part to be driven and the low-speed clutch device automatically connected therewith; and whereby also, when the load or resistance on the part to be driven increases, or the power received from the rotating power-actuating driven part decreases, so as to reduce the speed of the centrifugally-controlled clutch devices below the point at which the low-speed clutch device is set to operate, the said low-speed clutch device will also be automatically disconnected from the part to be driven and the power-actuated driving part thus be entirely disconnected from said part to be driven.

26. In a power-transmitting clutch and gearing device, adapted for use in automobiles, the combination with two friction clutch devices and centrifugally-controlled means whereby the acting faces of one of the said clutch devices are forced into frictional gripping contact at a predetermined speed different from that of the other, and means, controlled by the road resistance, whereby at a higher resistance the low-speed clutch device will alone be rendered operative while at a lower resistance the high-speed clutch device will alone be effective and the low-speed clutch device be rendered ineffective to transmit power to the shaft or part to be driven from the driving part or shaft.

27. In a power-transmitting clutch and gearing device, adapted for use in automobiles, the combination with two multiple-disk friction clutch devices, and centrifugally-controlled means whereby the acting faces of one of the said clutch devices are forced into frictional gripping contact at a predetermined speed different from that of the other, and means, controlled by the road resistance, whereby at a higher resistance the low-speed clutch device will alone be rendered operative while at a low resistance the high-speed clutch device will alone be effective and the low-speed clutch device be rendered ineffective to transmit power to the shaft or part to be driven from the driving part or shaft.

28. In a power-transmitting clutch and gearing device, adapted for use in automobiles, the combination with two friction clutch devices and centrifugally-controlled means for forcing the engaging faces of both of said clutch devices into gripping contact at the same time at high speeds, and a silent ratchet or grip device and gearing which allow said clutches both to remain in clutching engagement at the same time without interference.

29. In a power-transmitting clutch and gearing device, adapted for use in automobiles, the combination with two friction clutch devices, and means capable of forcing the engaging faces of both of said clutch devices into gripping contact at the same time, of a silent ratchet or grip device and gearing which allow said clutches both to remain in clutching engagement at the same time without interference, a shaft or part to be driven, and means for operatively connecting said clutch devices with said shaft or part.

30. In a power-transmitting clutch device, adapted for use in automobiles, the combination with two friction clutch devices and centrifugally-controlled means whereby the acting faces of one of the said clutch devices are forced into frictional gripping contact at a predetermined speed different from that of the other, and means, controlled by the road resistance, whereby at a higher resistance the low-speed clutch device will alone be rendered operative, while at a lower resistance the high-speed clutch device will alone be effective and the low-speed clutch device be rendered ineffective to transmit power to the shaft or part to be driven from the driving part or shaft.

31. In a power-transmitting clutch device, adapted for use in automobiles, the combination with two multiple-disk friction clutch devices, and centrifugally-controlled means whereby the acting faces of one of the said clutch devices are forced into frictional gripping contact at a predetermined speed different from that of the other, and means, controlled by the road resistance, whereby at a higher resistance the low-speed clutch device will alone be rendered operative, while at a low resistance the high-speed clutch device will alone be effective and the low-speed clutch device be rendered ineffective to transmit power to the shaft or part to be driven from the driving part or shaft.

In testimony whereof we affix our signatures in presence of two witnesses.

THOMAS L. STURTEVANT.
THOMAS J. STURTEVANT.

Witnesses:
W. H. ELLIS,
L. H. STURTEVANT.